April 3, 1951 J. H. EBERLY 2,546,988
CIRCUMFERENTIALLY TRAVELING THRUST
TIRE MOUNTING MACHINE
Filed April 5, 1947 9 Sheets-Sheet 6

Fig. 14

INVENTOR.
John Herr Eberly,
BY
John B. Brady
ATTORNEY

Patented Apr. 3, 1951

2,546,988

UNITED STATES PATENT OFFICE 2,546,988

CIRCUMFERENTIALLY TRAVELING THRUST TIRE MOUNTING MACHINE

John Herr Eberly, Lancaster, Pa., assignor, by mesne assignments, to The Sperry Corporation, New York, N. Y., a corporation of Delaware Application April 5, 1947, Serial No. 739,674

11 Claims. (Cl. 157—1.24)

My invention relates broadly to tire mounting machines and more particularly to an improved construction of mechanism for mounting tire casings on wheel rims.

One of the objects of my invention is to provide a time and labor saving machine for mounting tire casings on wheel rims without the abuse or injury of the tire casing.

Another object of my invention is to provide an improved construction of tire spreading tool for handling and mounting tire casings with respect to wheel rims.

Another object of my invention is to provide a construction of power operated tire mounting machine which permits a tire casing to be mechanically spread and mounted upon a wheel rim with minimum expenditure of time and with a high degree of efficiency.

Still another object of my invention is to provide a novel construction of clutch mechanism for tire mounting machines for controlling the operation of a power actuated tire mounting machine for rapidly spreading and mounting tires upon wheel rims.

Still another object of my invention is to provide an arrangement of tire mechanism for tire mounting machines operative to automatically shift a wheel rim and partially engaged tire from a convenient vertically disposed position to a horizontally disposed position in which the tire casing may be readily spread and mounted in position upon a wheel rim.

Other and further objects of my invention reside in an improved construction of tire mounting machine of wide application in the vehicle industry as set forth more fully in the specification hereinafter following by reference to the accompanying drawings in which:

My invention is directed particularly to a machine for mounting 24 x 7.50 tires on spoke wheels without using spreading and forcing hand tools, and performing the mounting work much easier and without abuse to the tire. While I have shown a machine adapted for 24 x 7.50 tires mere replacement of the size of the spreading arms serves to adapt the machine for mounting tires of any size. The drawings illustrate the machine and especially the functions of the spreader arms in the successive positions thereof.

The frame of the machine is made up from 2" pipe posts 1 extending vertically from floor plates 2 welded together with 3" channels 3 and 1¼" x ¼" flat steel transverse braces 4. Reference character 5 designates an electric motor of 1750 R. P. M. driving a small sheave 6 which drives belt 7 over an idler or tensioning wheel 8 to a 16" sheave 9 connected to speed reducing gear arranged in the housing designated at 10. The speed reducing gear in housing 10 drives an 11T ⅝" pitch sprocket wheel 11 which drives a sprocket chain 12 engaging a sprocket 13. Sprocket 13 drives shaft 14 to which is attached 11T bevel pinion 15 which drives 41T top bevel ring gear 16 and 41T bottom bevel gear 17 located in the housing 18.

The housing 18 is tiltable in a vertical plane with respect to the frame support formed by the posts 1 about a substantially horizontal axis. The housing 18 is supported on tubular trunnions connected with opposite sides thereof and extending in a substantially horizontal axis and journaled in bearings formed by angle members 68 and 69. The angle members 68 and 69 are supported adjacent the tops of the pipe posts 1 and serve as bearings into which the hollow tubes 55 and 60 extend. The hollow tube 55 serves as a housing for rotatable shaft 14 and connects to one side of housing 18, and revolves within the bearing formed by angle member 68. Tubular member 60 which revolves in angle member 69 connects to an angle member 61 at the end thereof adjacent housing 18, which angle member is connected with housing 18, thus forming a substantial transverse frame revolvable in trunnion-like manner with respect to bearings 68 and 69. Thus the housing 18 which supports the driven shaft 20 may be revolved in the angle members 68 and 69 for moving shaft 20 through a distance of substantially 90°.

To further brace the housing structure I provide a pair of pivotally connected links represented at 64 and 65 where link 64 is connected to the lower end of housing 18 and wherein link 65 is pivotally connected at 66 with the other end of link 64. The other end of link 65 is pivotally connected at 67 with the remote end of the housing, thereby considerably strengthening the assembly while guiding the assembly as the assembly moves throughout the quadrantal distance between the horizontal position and the vertical position.

In order to further strengthen the trunnion-like assembly I provide a brace 63 extending between one end of housing 18 and angle member 61 which connects with trunnion 60.

The hollow shaft 19 is welded to the underside of ring gear 16, while the shaft 20 is welded to the top side of ring gear 17, thus giving the hollow shaft 19 and the shaft 20 opposite rotation. The shaft 20 is supported at the top with a bronze bushing and at the bottom with a roller bearing 22. The hollow shaft 19 has a bronze bushing 23 and a steel bushing 24, while the drive shaft 14 is provided with a roller bearing 25 and a bronze bushing 26. To take care of the end thrust to which shafts 19 and 20 may be subjected when mounting the wheel I provide two sets of steel washers 27 above and below the ring gears 17—16, with a bronze washer 28 interposed between the steel washers of each of the sets of steel washers as shown. The set of steel washers 27 adjacent the ring gear 16 is mounted in a recessed portion of housing 18, while the set of steel washers adjacent the ring gear 17 is mounted adjacent the roller bearing 25 for withstanding the end thrust on the shafts 19 and 20.

Figure 1:
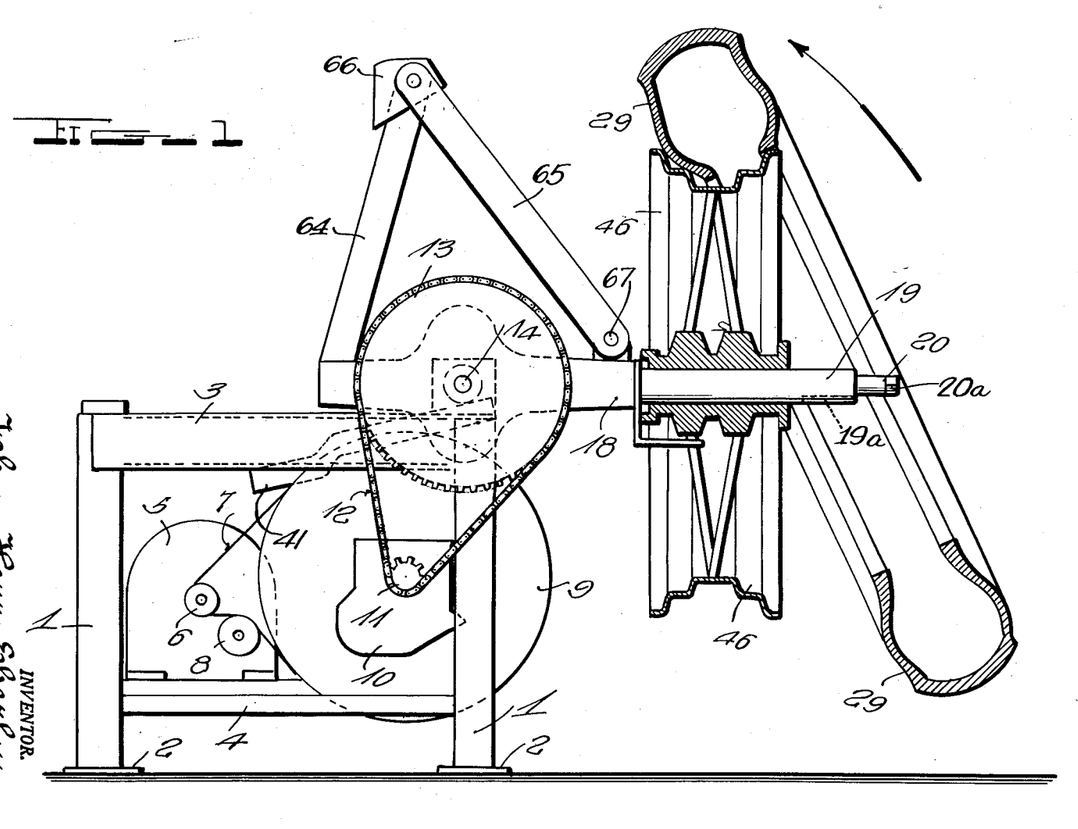
Figure 1 is a partial side elevational view of the tire mounting machine of my invention and showing a wheel rim and associated hub placed in position upon the tire mounting machine with a tire casing suspended thereon preparatory to the commencement of the tire mounting operation.

Referring to the manipulation of the machine, the housing 18 with the hollow shaft 19 and the shaft 20 are tilted to horizontal position by hand as shown in Figure 1. The spoked wheel rim 46 is pushed on the hollow shaft 19 and the tire 29 hung on the wheel rim 46 in such a position as will allow the conventional valve stem to fit the conventional valve stem in wheel rim 46.

Figure 2:
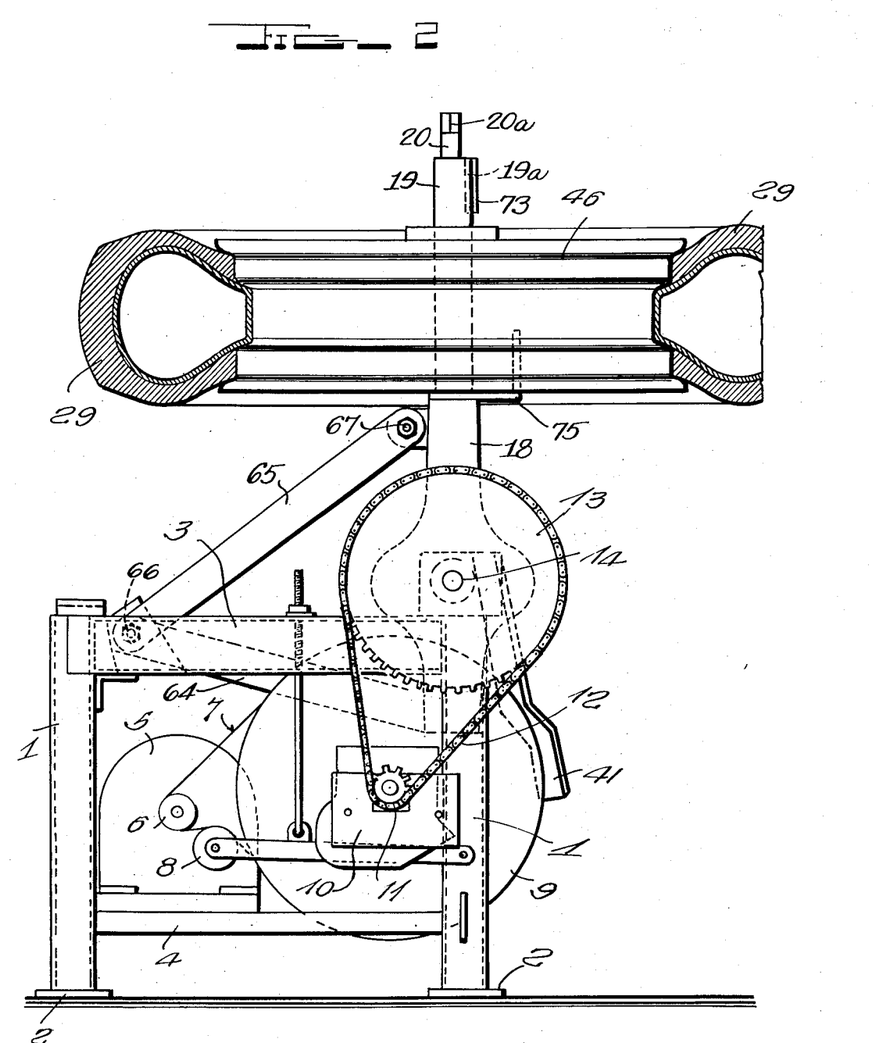
Fig. 2 is a side view of the tire mounting machine similar to the view illustrated in Figure 1, but showing the wheel rim and tire tilted upwardly to a horizontal position preparatory to the tire mounting operation.
Figure 14:
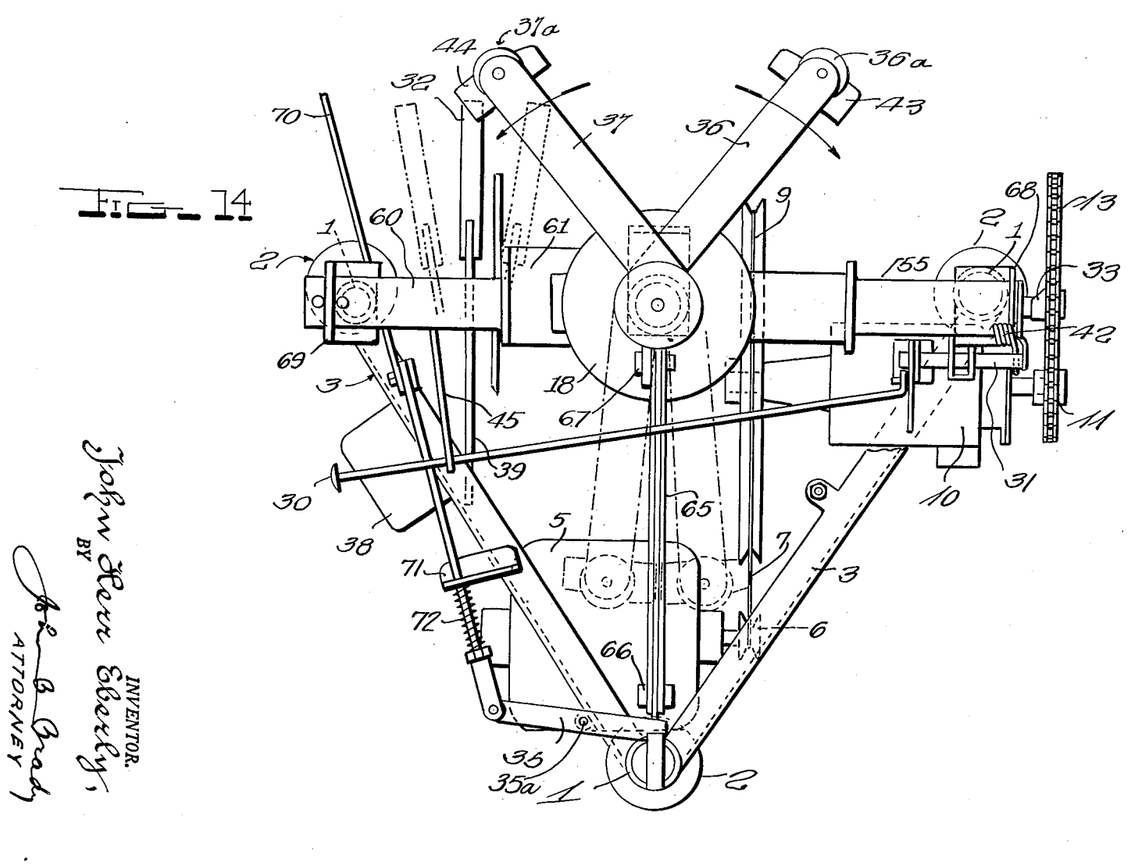
Fig. 14 is a top plan view of the complete tire mounting machine showing the relationship of the tire spreading arms and the clutch control mechanism for controlling the operation of the machine.

The tire, wheel, shafts and housing are then lifted into position as shown in Fig. 2. This lifting is done by power carried out in the following manner: the rod 30 connected to clutch pin 31 associated with retarding spring 42 is pushed in and the machine started by sliding and pushing down reversing switch treadle 32 controlling the electric power circuit to the driving motor 5. The clutch catching jaw 33 on chain sprocket 13 will perform the lift. When the lift is completed, the clutch pin 31 is automatically pushed out of mesh, the position of the tire and wheel rim 46 is held locked by the brace 64 through the rocking lever 35 as shown in Fig. 14. Rocking lever 35 is pivoted at 35a on one of the channels 3 and is controlled by lever 70. Lever 70 is movable through bracket 71 attached to channel 3. Coil spring 72 operates to move the rocking lever 35 in position to lock brace 64 in position to maintain the tire, wheel, shafts and housing 18 in lifted or vertical position.

The spreading arm 36 carrying roller or cam-like member 36a is now put on the hollow shaft 19, interconnecting the keyway 19a in the shaft and the keyway 36c in the hub 36b of the arm by a key 73. Then the other arm 37 with square aperture 37c in hub 37b is slid on the correspondingly-shaped end 20a of shaft 20 and thereby keyed to turn with the shaft.

The lower bead of tire 29 is pushed on by moving arms 36—37 to dotted position as shown in Fig. 14 and the dropping the bead of the tire over the rim. The successive positions of the tire spreading arms 36—37 have been illustrated commencing with Fig. 4 and extending in sequence through Figs. 6, 8, 10 and 12. The corresponding positions of the tire spreading arms 36—37 for each of the sequential positions illustrated are shown in plan view in Figs. 5, 7, 9 and 13 respectively. The arms 36 and 37 move with the positively driven shafts 19 and 20, respectively.

The sequence of steps will be clarified by observing that in Fig. 1 the wheel rim 46 pushed on the hollow shaft 19 by hand. Next, place the tire 29 on the wheel rim 46 and hold it in position by hand.

Figure 3:
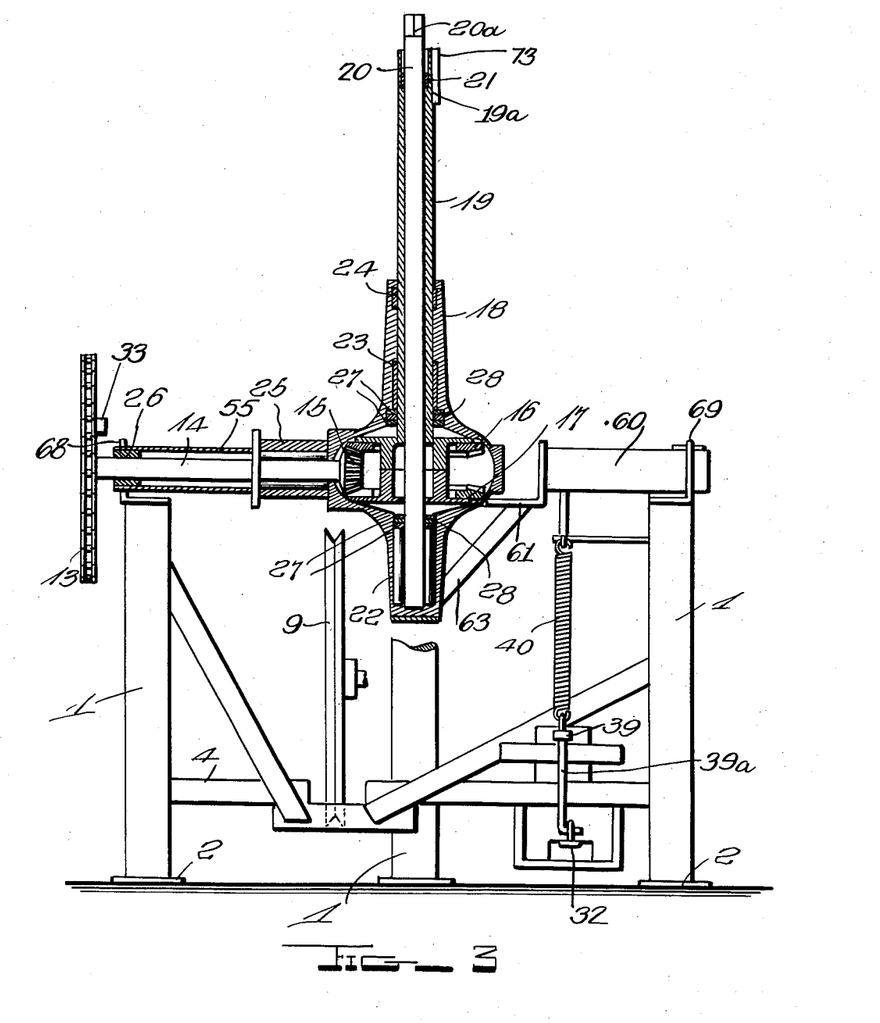
Fig. 3 illustrates the tire mounting machine raised to vertical position preparatory to a tire mounting operation.

Then start the machine to lift wheel 46 and tire 29 into horizontal position illustrated in Fig. 3. Put on the spreading arms 36 and 37. Hold the tire in position as shown in Fig. 4 with operator at right hand side of machine looking at Fig. 4.

Figures 4, 6, 7:
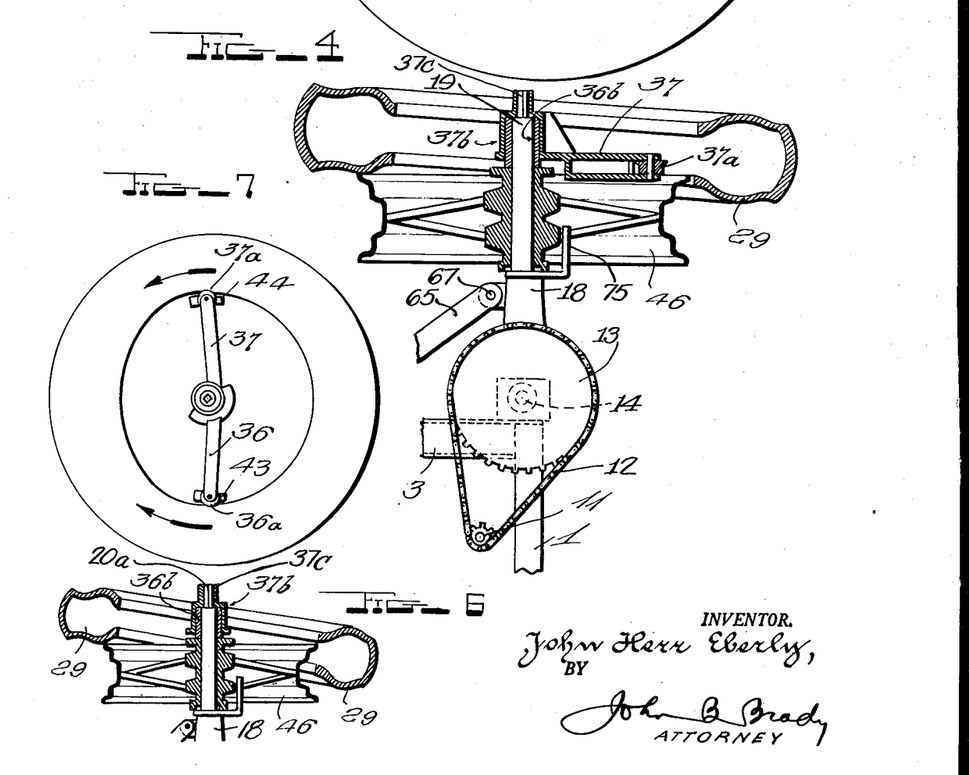
Fig. 4 is a view illustrating one of the first steps in mounting a tire casing on the wheel rim with the machine in tire mounting position.
Fig. 6 is a view illustrating the next successive step to that illustrated in Figs. 4 and 5 where one side of the tire casing is in the process of being engaged over the tire rim.
Fig. 7 is a top plan view of the tire mounting step illustrated in Fig. 6 with the spreader arms further advanced around the tire casing.
Figure 5:
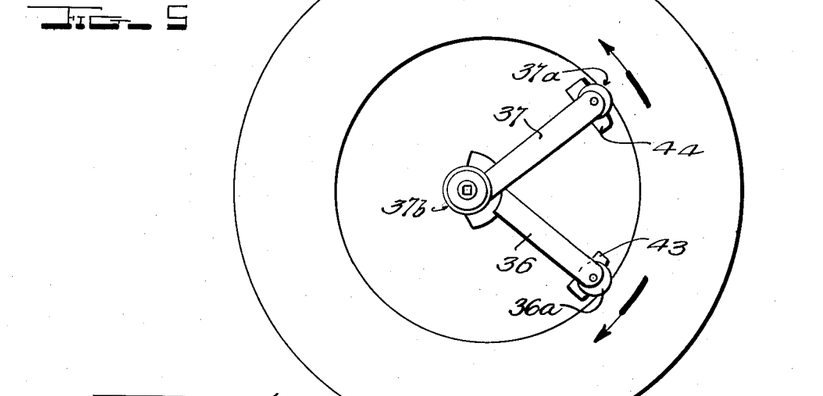
Fig. 5 is a top plan view showing the spreader arms at the commencement of the operation shown in Fig. 4 for slipping one side of the tire casing on the tire rim.

In Figs. 4–5 the spreading arms 36 and 37 have started their rotative path under positive power delivered by rotating shafts 19 and 20 driven by ring gears 16 and 17.

In Figs. 6–7 the spreading arms 36—37 have moved half way around and the tire is held down as shown at right side looking at the right hand side of the machine as shown in Fig. 4.

Figures 8, 9, 10, 11, 12, 13:
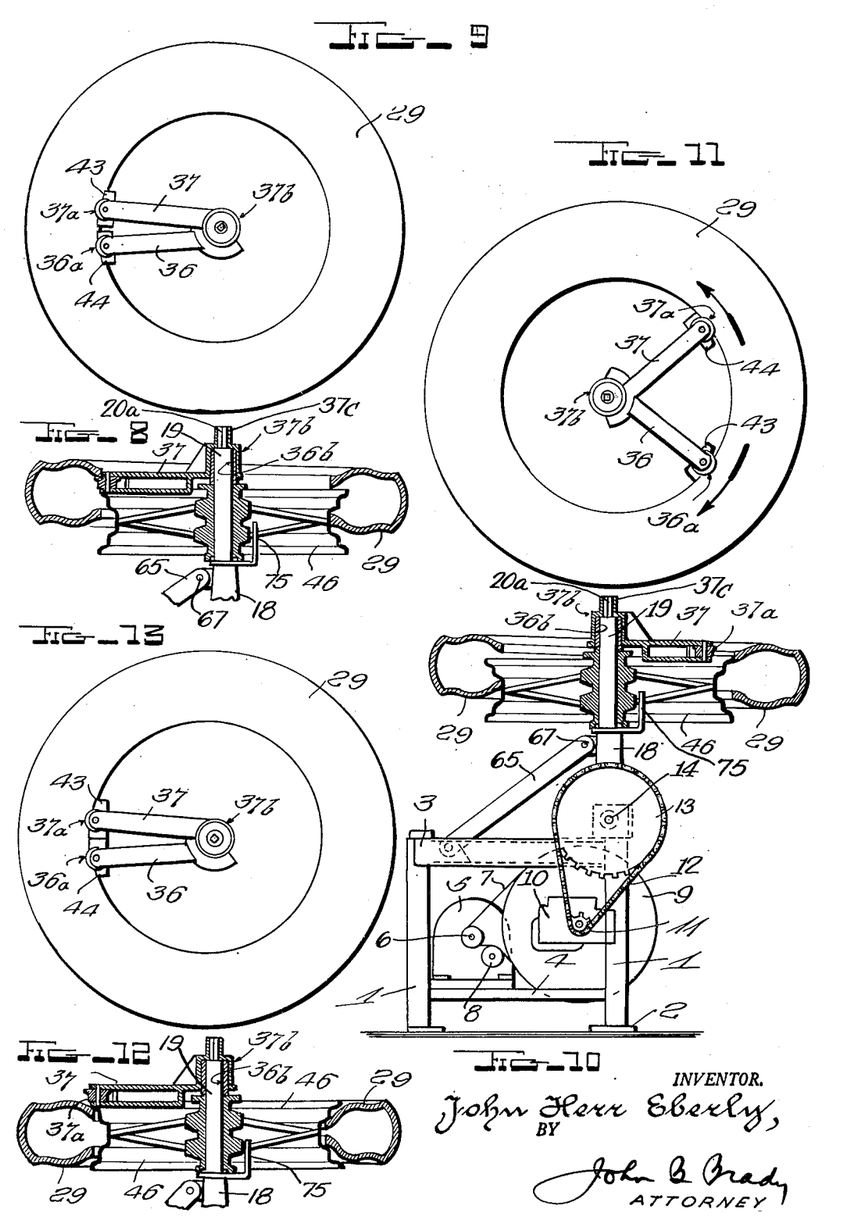
Fig. 8 illustrates the next succeeding step in mounting the tire casing on the tire rim where the spreader arms have completed a revolution for spreading the tire casing with respect to the tire rim.
Fig. 9 is a top plan view of the spreader arms and casing at the sequence illustrated in Fig. 8.
Fig. 10 is a sectional view illustrating the next succeeding step in spreading the tire casing where one wall of the casing has been engaged over the rim and where the opposite wall of the casing is about to be engaged over the rim.
Fig. 11 is a top plan view of the tire illustrated in Fig. 10 showing the position of the spreader arms as they commence the final spreading operation for stretching the tire casing over the rim.
Fig. 12 is a cross sectional view showing the completed spreading operation in which both sides of the tire casing are engaged over the tire rim.
Fig. 13 is a top plan view of the sequence illustrated in Fig. 12.

In Figs. 8–9 the spreading arms 36—37 have completed the turn and the lower bead of the tire has dropped below the top of the rim of the wheel rim 46.

In Figs. 10–11 the spreading arms 36—37 have been turned to the starting position. The upper bead of the tire 29 is hooked down below the rims of the roller or cam-like members 36a and 37a of the spreading arms 36—37 with a light tool, and the tire 29 is held by hand until the arms 36—37 start to move again.

In Figs. 12–13 the spreading arms 36—37 have completed the turn and the tire 29 has slipped down between the rims of wheel rim 46.

The next operation is to return the spreading arms 36—37 to the position and take them away from the shafts 19 and 20.

Throughout these operations the wheel rim 46 is fixed against rotation by angle member 75 fixed to housing 18 and projecting between the spokes of the wheel rim 46 and in abutment therewith.

The tube valve stem of the inner tube of the tire is pulled through wheel rim 46 in conventional manner. The conventional air hose is held to the valve to fill the tube partly with air. The conventional valve nut is then screwed on and the filling of the inner tube with air continued to the specified inflation pressure of about 45 pounds. The conventional valve cap is then put on. The machine is then tilted down by operating lever 70 to disengage the brace 64. The wheel rim with the tire mounted thereon is then removed in a substantially horizontal direction.

It will be observed that the arms 36 and 37 each carry pivotally mounted rollers or cam-like members 36a and 37a in the tips thereof. Special attention is called to the shape of the tip 43 on arm 36 and the shape of the tip 44 on arm 37 in the form of cam-like members. These cam-like tips 43 and 44 are preformed for the special purpose of supporting the bead of the tire 29 while the arms 36 and 37 perform their movement to roll the tire on the wheel rim. The cam-like members 36a and 36b are each pivotally mounted in the yoke-like ends of arms 36 and 37.

Figs. 19–23 show the arms 36 and 37 and the roller or cam-like members 36a and 37a in the tips thereof and the the cam portions thereof at 43 and 44 in more detail. The coaction of the hub portions 36b and 37b of the arms 36 and 37 are illustrated clearly in Fig. 19. In order to return the arms 36 and 37 to starting position the direction of rotation of the mechanism is reversed. For this purpose the main switch in casing 38 is controlled by the reversing switch treadle 32 cooperating through lever 39. The reversing switch treadle rod 39a and spring 40 is provided for restoring the reversing switch treadle 32 to normal position from the positions to which it is moved.

I also provide a tilting stop bracket 41 attached to the tiltable assembly and adapted to abut in either of two limiting positions with the frame of the apparatus, for limiting the substantially horizontal position to which the tiltable assembly may be moved as shown in Figs. 1 and 2.

Figures 15, 16, 17:
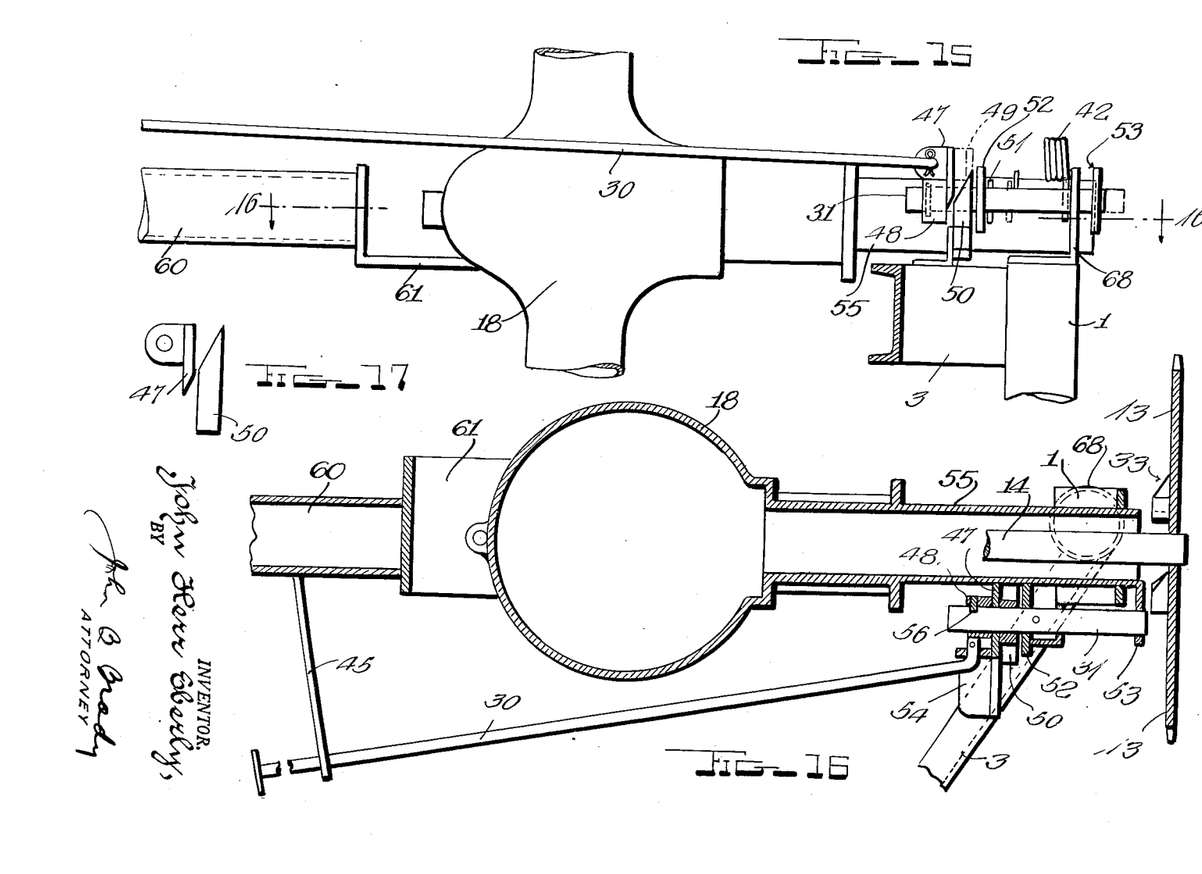
Fig. 15 is an enlarged side elevational view of the clutch mechanism and the associated operating parts in the tire mounting machine.
Fig. 16 is a longitudinal sectional view through the clutch mechanism and associated parts taken substantially on line 16—16 of Fig. 15.
Fig. 17 is a detailed view of the two active parts which function in the release of the clutch mechanism.
Figures 18, 19, 20, 21, 22, 23, 24, 25, 26:
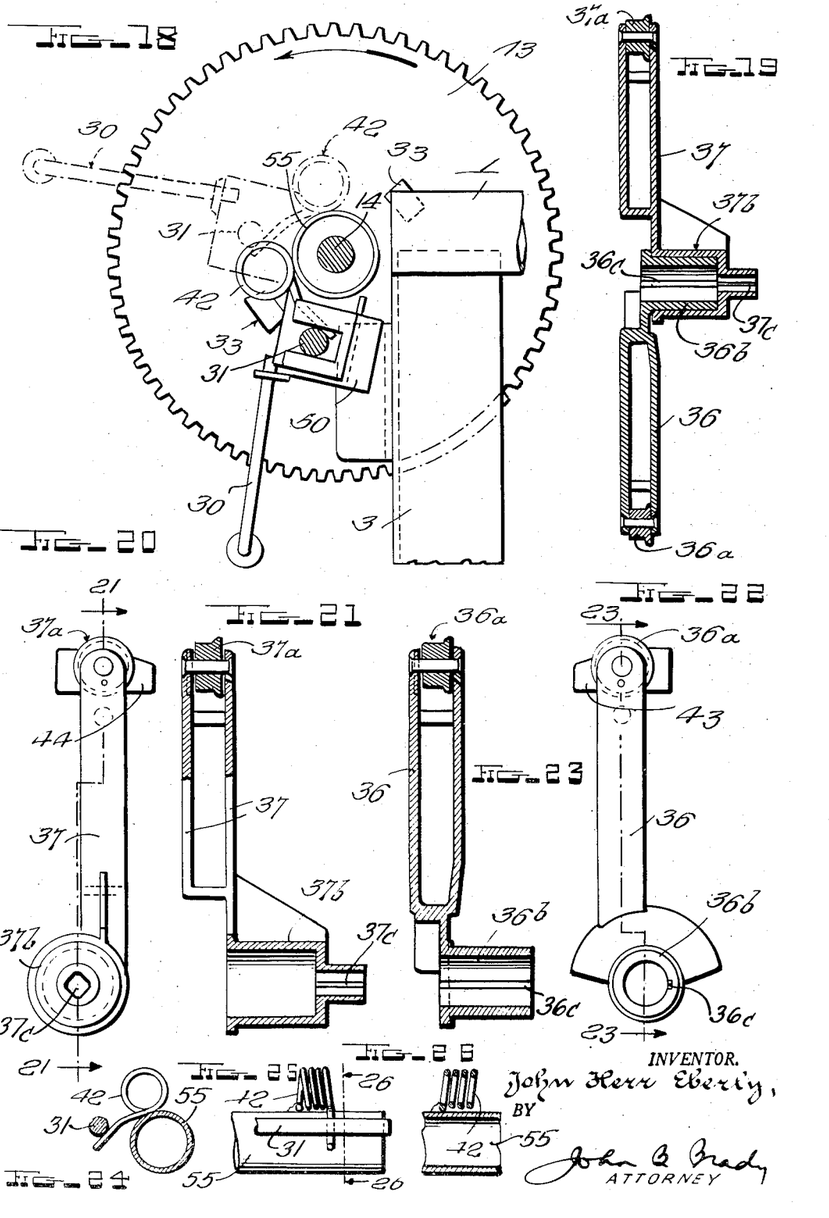
Fig. 18 is an end elevational view of the clutch mechanism and associated parts, the view showing the drive shaft and clutch control lever in transverse section.
Fig. 19 is a cross-sectional view of the two spreader arms used in the tire mounting machine and showing the manner in which the arms are inter-engaged for mutual rotation in performing a spreading operation.
Fig. 20 is a top plan view of one of the spreader arms.
Fig. 21 is a longitudinal sectional view through the spreader arms shown in Fig. 20 taken substantially on line 21—21 of Fig. 20.
Fig. 22 is a plan view of the coacting spreader arm employed in the assembly shown in Fig. 19.
Fig. 23 is a longitudinal sectional view taken substantially on line 23—23 of Fig. 22.
Fig. 24 is a detailed cross-sectional view illustrating the co-action of the clutch control operating shaft and the housing of the clutch control mechanism.
Fig. 25 is a fragmentary side elevational view of the assembly illustrated in Fig. 24.
Fig. 26 is a cross-sectional view taken substantially on line 26—26 of Fig. 25.
Figure 27:
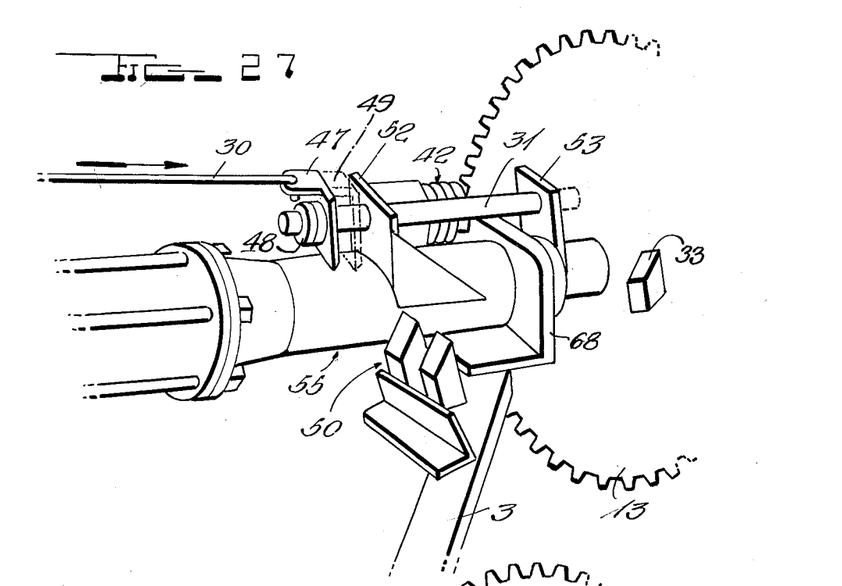
Fig. 27 is a fragmentary perspective view of the clutch parts as they appear in the tilted position of the tire mounting machine and before the clutch control rod is pushed in for effecting an engagement of the clutch.

In order to clarify the lifting operation reference is made to Figs. 15 and 16 from which it will be seen that when the clutch rod 30 with the angle member 47 secured thereto and hub 48 is pushed to the right, movement limited and guided by the cotter pin 51 is permitted to the dotted line position 49 shown in Figs. 15 and 27. The machine is started by sliding and pushing down reversing treadle 32 closing the power control circuit through the switch in casing 38 to the driving motor 5. One of the two jaws 33 attached to sprocket wheel 13 engages the clutch pin 31 whereby the tiltable assembly 18 with the driven shafts 19 and 20 associated therewith revolve to the vertical position shown in Fig. 2, making the quarter turn and completing the lift. At this point the clutch pin 31 is moved back out of mesh with the jaws 33.

The release of the clutch pin 31 is as follows: The angle 47 is tapered at the lower side, which slides off the slanted release block 50, Fig. 17, when the quarter turn is carried out as will be explained later. This finishes the activity of the clutch, to be repeated with each succeeding tire operation.

The spring 42 attached to the tubular housing 55 helps to stabilize the movement of the clutch pin 31. The clutch rod 30 slides loosely in bracket 45 which extends from trunnion member 60. Reference characters 52 and 53 designate the brackets which support the clutch pin 31. Reference character 56 designates a thrust key connecting the hub 48 to the pin 31 and insuring stabilized movement of the pin. The slanted release block 50 is welded to the angle 54, which is supported by the channel 3.

Figure 28:
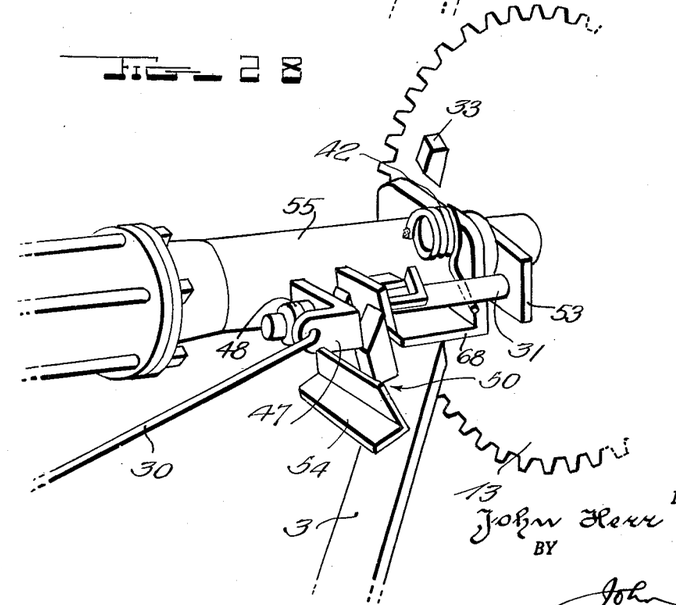
Fig. 28 is a perspective view of the clutch mechanism in engaged position.

The perspective views of Figs. 27 and 28 will clarify the operation of the clutch mechanism.

Fig. 27 is a perspective view of the clutch parts as they appear in the tilted position of the machine wherein the clutch is not as yet pushed in for engagement. The dotted lines indicate the path of movement of the clutch pin 31 actuated by the angle 47 and the rod 30 to become engaged by the jaws 33 on the sprocket wheel 13 to lift the tilting part of the machine into a vertical position.

During this lifting period the clutch moves with the housing approximately 90° and will terminate the movement in the position as shown in Fig. 28, where the angle 47 has met the sliding block 50 which pushes the angle 47 and clutch pin 31 back out of reach of the jaws 33 on the sprocket wheel 13.

In the perspective view of Fig. 28 the spring 42 is shown with the end of the first convolution welded to the tube 55. The other end of spring 42 extends behind the clutch pin 31, applying tension on the pin to stabilize and render more positive its movements. The spring 42 is also illustrated in Fig. 27.

The tube valve of the tire is adjusted and the tire pushed down using a tire tool to hook the bead over the rim at the starting position with the coaction of the cam-like members in the ends of the movable arms 36 and 37. The spreading arms 36 and 37 spread the upper bead until the tire falls into the wheel rim 46. Tire, wheel and shafts are now tilted back to starting position by lifting the lever 70 to disengage the latch established between rocker arm 35 and brace 64. The mounted tire and wheel are then removed from the machine, the tube filled to proper pressure, valve checked, valve cap screwed on and the operation is finished.

The tire mounting machine of my invention has proven highly practical in its manufacture, production and operation and while I have described the mechanism of my invention in certain preferred embodiments I realize that modifications and improvements may be made and I desire that it be understood that I intend no limitations upon my invention other than may be imposed by the scope of the appended claims.

What I claim as new and desire to secure by Letters Patent of the United States is as follows:

1. A tire mounting machine comprising a supporting frame structure including a pair of trunnion-like spaced supports, a tire mounting frame structure having a pair of transversely extending cylindrical members projecting therefrom and journaled in said trunnion-like spaced supports on said supporting frame structure and carrying a shaft member thereon, one of said members being tubular, said tire mounting frame structure and shaft member being movable from a position in which said shaft member extends in a substantially horizontal position to a position in which said shaft member extends in a substantially vertical direction, a driving motor carried by said supporting frame structure, a driven shaft connected with said driving motor and extending through said tubular member, and means for driving said shaft member from said driven shaft.

2. A tire mounting machine comprising a supporting frame structure including a pair of trunnion-like spaced supports, a tire mounting frame structure having a pair of transversely extending cylindrical members projecting therefrom and journaled in said trunnion-like spaced supports on said supporting frame structure and carrying a pair of shaft members thereon one of said cylindrical members being tubular, said tire mounting frame structure and shaft member being movable from a position in which said shaft member extends in a substantially horizontal position to a position in which said shaft member extends in a substantially vertical direction, a driving motor carried by said supporting frame structure, a driven shaft connected with said driving motor and extending through said tubular member, and means for driving said shaft member from said driven shaft.

3. In a tire mounting machine, a supporting frame structure including a pair of trunnion-like spaced supports, a tire mounting frame structure having a pair of transversely extending cylindrical members projecting therefrom and journalled in said trunnion-like supports, a rotatable shaft member carried by said tire mounting structure, a rotatable coacting sleeve surrounding said shaft member and carried by said tire mounting frame structure one of said cylindrical members being tubular, a driving motor on said supporting frame structure, means operated by said driving motor for shifting said tire mounting structure including said rotatable shaft member and coacting rotatable sleeve from a substantially horizontal position to a substantially vertical position, a driven shaft connected with said driving motor and extending through said tubular member, and means for driving both said shaft member and said coacting sleeve from said driven shaft.

4. A tire mounting machine comprising a supporting frame structure, including a pair of trunnion-like spaced supports, a tire mounting frame structure having a pair of transversely extending cylindrical members projecting therefrom and journaled in said trunnion-like spaced supports for limited tilting movement with respect to said supporting frame structure one of said cylindrical members being tubular, a rotatable shaft mechanism carried by said tiltable frame structure, a prime mover carried by said supporting frame structure, means connected between said prime mover and said tiltable auxiliary frame structure for elevating said rotatable shaft mechanism from a substantially horizontal position to a substantially vertical position, a drive shaft connected with said prime mover and extending through said tubular member, and means for driving said rotatable shaft mechanism from said drive shaft.

5. A tire mounting machine comprising a supporting frame structure, including a pair of trunnion-like spaced supports, a tire mounting frame structure having a pair of transversely extending cylindrical members projecting therefrom and journaled in said trunnion-like spaced supports for limited tilting movement with respect to said supporting frame structure one of said cylindrical members being tubular, a rotatable shaft mechanism carried by said tiltable frame structure, a prime mover carried by said supporting frame structure, means connected between said prime mover and said tiltable auxiliary frame structure for tilting said rotatable shaft mechanism from a substantially horizontal position to a substantially vertical position for effecting a tire mounting operation, a driven shaft connected with said prime mover and extending through said tubular member, means for driving said shaft mechanism from said driven shaft and clutch mechanism for governing the sequence of tilting and tire mounting operations.

6. In a tire mounting machine a supporting frame structure including a pair of trunnion-like spaced supports, a prime mover carried by said frame structure, a tire mounting frame structure having a pair of transversely extending cylindrical members projecting therefrom and journaled in said trunnion-like spaced supports and tiltably carried by said supporting frame structure one of said cylindrical members being tubular, shaft mechanism carried by said tire mounting frame structure and tiltable from a substantially horizontal position to a substantially vertical position, means extending through said tubular member and interconnecting said prime mover and said tire mounting frame structure for tilting said shaft mechanism to a substantially vertical position and means operated by said prime mover while said shaft mechanism is in substantially vertical position for effecting a tire mounting operation.

7. In a tire mounting machine a supporting frame structure including a pair of trunnion-like spaced supports, a prime mover carried by said frame structure, a tire mounting frame structure having a pair of transversely extending cylindrical members projecting therefrom and journaled in said trunnion-like spaced supports and tiltably carried by said supporting frame structure one of said cylindrical members being tubular, shaft mechanism carried by said tire mounting frame structure and tiltable from a substantially horizontal position to a substantially vertical tire-mounting position, means extending through said tubular member and interconnecting said prime mover and said tire mounting frame structure for tilting said shaft mechanism to a substantially vertical position and tire mounting means operated by said shaft mechanism from said prime mover through the aforesaid means for effecting a tire mounting operation.

8. In a tire mounting machine a supporting frame structure including a pair of trunnion-like spaced supports, a prime mover carried by said frame structure, a tire mounting frame structure having a pair of transversely extending cylindrical members projecting therefrom and journaled in said trunnion-like spaced supports tiltably carried by said supporting frame structure one of said cylindrical members being tubular, shaft mechanism carried by said tire mounting frame structure and tiltable from a substantially horizontal position to a substantially vertical position, means extending through said tubular member and interconnecting said prime mover and said tire mounting frame structure for tilting said shaft mechanism to a substantially vertical position, tire mounting means carried by said tire mounting frame structure and spring actuated clutch mechanism for governing the tilting movement of said shaft mechanism and the operation of said tire mounting means.

9. In a tire mounting machine a supporting frame including a pair of trunnion-like spaced supports, a prime mover supported by said frame, a tire mounting frame structure having a pair of transversely extending cylindrical members projecting therefrom and journaled in said trunnion-like spaced supports, a shaft mechanism supported by said tire mounting frame structure and including a concentrically mounted inner shaft and outer sleeve, one of said cylindrical members being tubular, means extending through said tubular member and operated by said prime mover for rotating said inner shaft and outer sleeve in opposite angular directions, tire mounting means operated by said shaft mechanism, and means interposed between the aforesaid means and said prime mover for tilting said tire mounting frame structure from a horizontal position to a vertical position.

10. In a tire mounting machine a tire casing spreader device comprising a member for engaging the bead of a tire casing for spreading the casing with respect to a wheel rim including a central curved surface and a cam-like surface co-extensive therewith and projecting on opposite sides thereof, an angularly movable spreader arm supporting said device in alignment with the center of said central curved surface, said central curved surface being flanged adjacent one peripheral edge thereof for facilitating the engagement of the bead of the tire casing and the stretching of the tire casing into engagement with a wheel rim.

11. In a tire mounting machine tire casing spreader device comprising a member for engaging the bead of a tire casing for spreading the casing for application to a wheel rim comprising a central curved surface and a cam-like surface co-extensive therewith and projecting in opposite directions therefrom and curved on the extremity thereof in a contour substantially in conformity with the direction of the path of movement thereof, an angularly movable spreader arm supporting said device in radial alignment with the center of said central curved surface, said central curved surface forming a shaped terminus member adjacent said cam-like surface for facilitating the engagement of the tire casing and the stretching of the tire casing over a wheel rim.

JOHN HERR EBERLY.

REFERENCES CITED

The following references are of record in the file of this patent:

UNITED STATES PATENTS

| Number | Name | Date |
| --- | --- | --- |
| 595,548 | Rodgers | Dec. 14, 1897 |
| 668,067 | Stutsman | Feb. 12, 1901 |
| 1,977,297 | Weaver | Oct. 16, 1934 |
| 2,201,982 | Bazarek | May 28, 1940 |
| 2,213,535 | Seip | Sept. 3, 1940 |
| 2,349,552 | Holmes | May 23, 1944 |
| 2,437,512 | Ekse | Mar. 9, 1948 |
| 2,439,615 | Smith | Apr. 13, 1948 |

FOREIGN PATENTS

| Number | Country | Date |
| --- | --- | --- |
| 403,591 | France | Sept. 28, 1909 |